United States Patent

[11] 3,610,282

| [72] | Inventor | George V. Woodling<br>22071 W. Lake Road, Rocky River, Ohio 44116 |
|---|---|---|
| [21] | Appl. No. | 50,113 |
| [22] | Filed | June 26, 1970 |
| [23] | | Division of Ser. No. 715,247, Mar. 22, 1968, Pat. No. 3,531,225. |
| [45] | Patented | Oct. 5, 1971 |

[54] VALVING MEANS FOR FLUID PRESSURE OPERATING MEANS
18 Claims, 5 Drawing Figs.

[52] U.S. Cl. .................................................. 137/625.21
[51] Int. Cl. ............................................. F16k 35/00, F16k 11/02, F01c 1/10
[50] Field of Search ............................................. 137/625.21; 277/88; 418/54, 61; 251/157, 180

[56] References Cited
UNITED STATES PATENTS

| 1,237,693 | 8/1917 | Prott | 137/625.21 X |
| 2,100,014 | 11/1937 | McCracken | 91/56 X |
| 3,122,375 | 2/1964 | Greenwald | 277/88 |

*Primary Examiner*—Henry T. Klinksiek
*Attorney*—Woodling, Krost, Granger & Rust

ABSTRACT: Stationary valve and rotary valve for fluid pressure operating means, in which the rotary valve has an external annular surface including at least first and second opposed external flanges defining an external fluid chamber extending therearound. The rotary valve also has an internal annular surface including at least third and fourth opposed internal flanges defining an internal fluid chamber. Said stationary valve and said rotary valve have fluid connection means extending therethrough for controlling the flow of fluid between said chambers and said fluid pressure operating means. Axial force means constrains said rotary valve against said stationary valve. The rotary valve has a radial clearance with the hosing in which it is rotatably mounted and is independently mounted from the main shaft, whereby it is free from both the radial thrust and the end thrust to which the main shaft may be subjected.

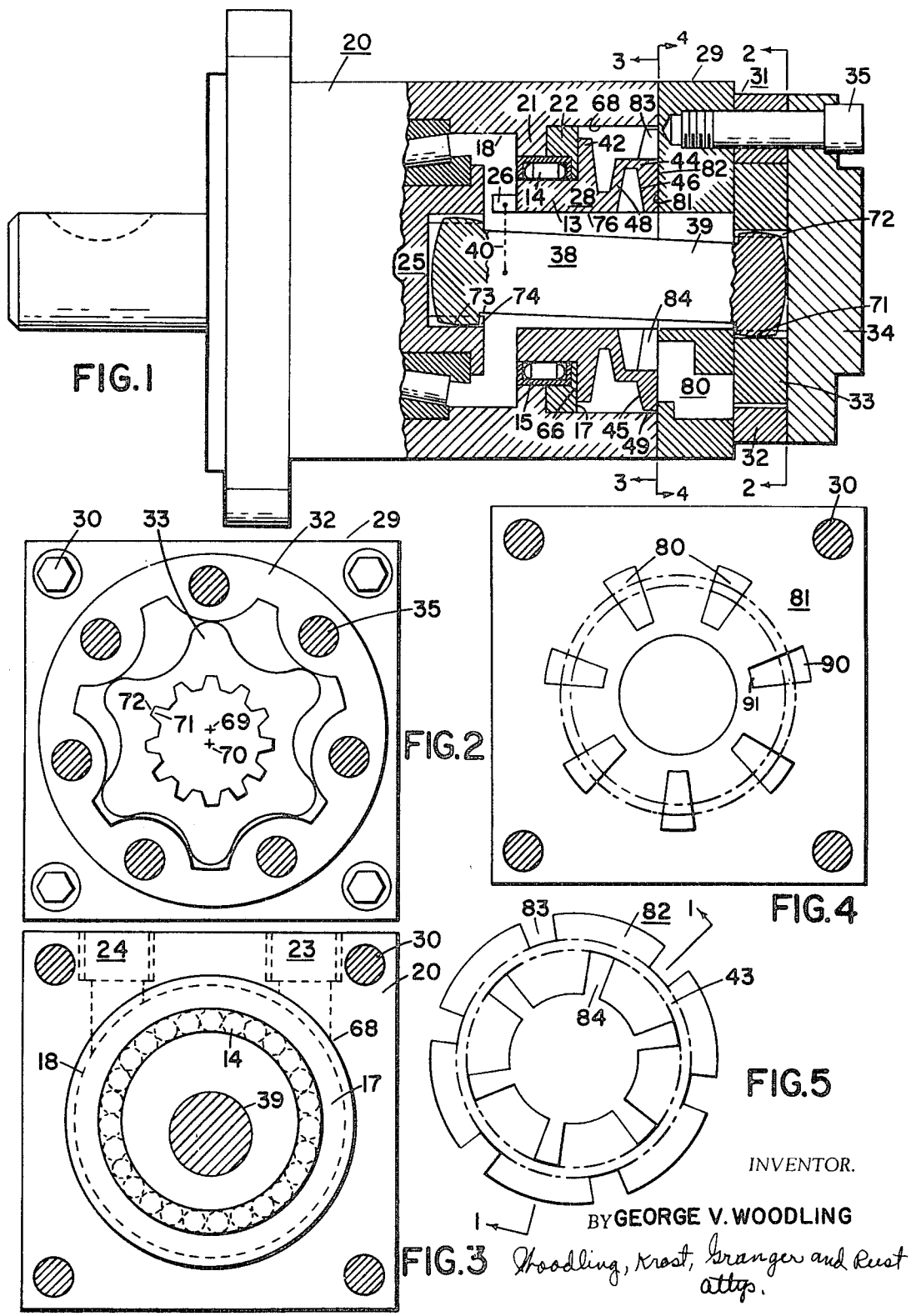

3,610,282

VALVING MEANS FOR FLUID PRESSURE OPERATING MEANS

This application is a division of my application, Ser. No. 715,247, filed Mar. 22, 1968 now U.S. Pat. No. 3,531,225.

BACKGROUND OF THE INVENTION

Fluid leakage is often a critical factor in face-type valving. If the face friction is too high in an attempt to prevent leakage, the rotary valve will turn hard and wear out quickly, which eventually will cause more leakage.

It has been proposed that thrust-type bearings be used to relieve the face friction, which, of course, is expensive.

Attempts to hold the spacing between the face-type valving to a low valve in the order of 0.0005 inch to prevent leakage is also expensive and substantially impossible from the standpoint of production.

Accordingly, it is an object of my invention to prevent leakage by impositively constraining the face-type valving against each other.

Another object is to free the rotary valve from both radial thrust and end thrust.

Another object is to independently mount the rotary valve from the main shaft, whereby the rotary valve is free from both the radial thrust and the end thrust to which the main shaft may be subjected.

Another object is the provision of a face-type rotary valve which is simple in construction and efficient in performance.

Another object is the provision of a hollow face-type rotary valve having a first fluid chamber on the outside thereof and a second fluid chamber on the inside thereof.

SUMMARY OF THE INVENTION

The invention constitutes valving means for fluid pressure device having first and second fluid port means and fluid pressure operating means, first and second fluid connection means for respectively connecting said first and second fluid port means commutatively with said fluid pressure operating means, said first and second fluid connection means including stationary valve means and rotary valve means having first and second end portions, said stationary valve means having a stationary valve face and a plurality of circumferentially disposed fluid openings extending from said stationary valve face and communicating with said fluid pressure operating means, wall body means including face wall means disposed substantially parallel to and spaced axially from said stationary valve face, said first end portion of said rotary valve means having a rotary valve face sealingly engaging said stationary valve face, said second end portion of said rotary valve means having a rotary end face sealingly engaging said face wall means, said first and second fluid connection means extending through said stationary and rotary valve faces, said first fluid connection means including first fluid chamber means in constant fluid communication with said first fluid port means, said rotary valve means having first surface wall means extending externally therearound and axially disposed between said first and second end portions, said first fluid chamber means having first chamber wall means including said first surface wall means, said first and second end portions of said rotary valve means respectively having first and second body portion means extending outwardly from said first surface wall means, said first fluid connection means extending through said first body portion means, said first body portion means having first and second opposed walls, said rotary valve face including said first opposed wall, said second body portion means having third and fourth opposed walls, said rotary end face including said third opposed wall, said first chamber wall means also including said second opposed wall of said first body portion means and said fourth opposed wall of said second body portion means, said first surface wall means extending between said second opposed wall of said first body portion means and said fourth opposed wall of said second body portion means and defining with said second and fourth opposed walls an external annular fluid channel extending around said rotary valve means.

BRIEF DESCRIPTION OF THE DRAWINGS

Other objects and a fuller understanding of the invention may be had by referring to the following description and claims, taken in conjunction with the accompanying drawings, in which:

FIG. 1 is a side view of a fluid pressure device, in which my invention may be incorporated, parts being shown in vertical section to illustrate the rotary valve for controlling the entrance of fluid to and the exit of fluid from the stator-rotor mechanism, the section through the rotary valve means being taken along the line 1—1 of FIG. 5;

FIG. 2 is a view taken along the line 2—2 of FIG. 1, under the end cap, showing the stator-rotor mechanism;

FIG. 3 is a view taken along the line 3—3 of FIG. 1, with the rotary valve being omitted, the view being principally a right-hand end view of the hollow housing showing the fluid ports and the bearing support means for the rotary valve, including a cross section of the actuating shaft;

FIG. 4 is a view taken along the line 4—4 of FIG. 1, and showing the side of the stationary valve member against which the rotary valve sealingly engages; and FIG. 5 is a view taken along line 3—3 of FIG 1, showing only the rotary valve face which sealingly engages the stationary valve face of FIG. 4.

DESCRIPTION OF THE PREFERRED EMBODIMENT

Briefly, the fluid pressure device comprises a main housing 20, a main shaft 25 rotatively mounted in the housing, a stator-rotor mechanism 31 having a stator element 32 and a rotor element 33, a stationary valve member 29 and a rotary valve member 28. An end cap 34 enclosed the stator-rotor mechanism. The end cap may be held by a screw 35. An actuating shaft 39 drivingly interconnects the main shaft 25 to the rotor element 33. The actuating shaft 39 has an intermediate portion 38 disposed to rotate the rotary valve 28 through rotational drive means indicated by the dotted line 40. The stationary valve member 29 has face wall means including a stationary valve face 81 abutting against the end wall of the housing 20, whereby the housing and the stationary valve member constitute enclosure means for the rotary valve. The stationary valve member 29 may be secured to the end of the housing 20 by screws 30. The housing 20 is hollow from end to end, and intermediate the ends of the hollow housing, there is provided an internal rib 21, which generally separates the hollow housing into a left-hand end compartment in which the main shaft 25 is rotatively mounted and a right-hand end compartment in which the rotary valve is rotatively mounted.

Pressed against the internal rib 21 is a bushing 22 having a right-hand stationary end face 17 disposed substantially parallel to and spaced axially from the stationary valve face 81. The rotary valve 28 is mounted between the stationary valve face 81 and the stationary end face 17 and has a rotary valve face 82 which makes a fluid sealing engagement with the stationary valve face 81 and a rotary end face 66 which makes a fluid sealing engagement with the stationary end face 17. The rotary valve 28 is mounted within a counter bore having an internal wall surface 68 surrounding and radially spaced from the rotary valve member 28 and defines therewith external (first) annular fluid chamber means which extends all the way around the rotary valve member. The external annular fluid chamber is connected in constant fluid communication with a fluid port 23 provided in the housing 20, see FIG. 3. The fluid port 23 extends through the housing wall and intersects with the internal wall surface 68, next adjacent the right-hand side of the bushing 22.

The rotary valve member 28 has a hollow shaft 13 with inside and outside surfaces. The hollow shaft 13 extends from the rotary valve member and has a bearing portion mounted with an antifriction roller bearing unit 14. The bearing unit 14 comprises a plurality of roller bearings encompassing the bearing portion of the hollow shaft 13 and mounted within a cup 15 which is pressed into the inner surfaces of the rib 21 and the bushing 22. The hollow shaft 13 extends through, and has a terminating end portion provided with a boss 26 projecting in an axial direction beyond the roller bearing unit 14.

The rotary valve member 28 has a central opening defined by internal wall surface means 76. This opening, including also the opening in the hollow shaft 13, constitutes internal (second) annular fluid chamber means connected in constant fluid communication with a fluid port 24 provided in the housing 20, see FIG. 3. The fluid port 24 extends through the housing wall and intersects with an internal bore 18, next adjacent the left-hand side of the internal rib 21.

The length of the rotary valve 28 must match the axially fixed length between the stationary end face 17 of the bushing 22 and the stationary valve face 81. To this end, the rotary valve 28 is provided with built-in axial fixation means, whereby its effective length may be varied to match the axially fixed length between the stationary end face 17 and the stationary valve face 81. As shown in FIG. 1, the hollow shaft 13 of the rotary valve 28 has an external annular flange 42 connected thereto and is provided with a sealing surface constituting the rotary end face 66 in fluid sealing engagement with the stationary end face 17 of the bushing 22. The hollow shaft 13, between the stationary end face 17 and the stationary valve face 81, may be characterized as comprising an annular valve body having a terminating end portion 44 with an end face constituting an annular surface area band 43, see FIG. 5, where the band 43 is indicated by the concentric dash dot lines. The terminating end portion 44 has an external flange rim 45 extending outwardly therefrom and an internal flange rim 46 extending inwardly therefrom. Preferably, there is a clearance 49 between the outside of the external flange rim 45 and the internal wall surface 68, with the result the rotary valve is solely supported for rotation by the antifriction bearing unit 14. The external flange rim 45 separates fluid in the external (first) annular fluid chamber from the stationary valve face 81 and the internal flange rim 46 separates fluid in the internal (second) annular fluid chamber from the stationary valve face 81. The external flange rim 45 and the internal flange rim 46 define a rotary face which, together with the annular surface area band 43, constitutes the rotary valve face 82. The terminating end portion 44 of the annular valve body from which the external and internal flange rims 45 and 46 extend, may be characterized as a common intermediate annular body portion having a diameter greater than that of the hollow shaft 13. Interconnecting the common intermediate annular body portion and the hollow shaft 13 is a sloping annular connecting disk 48 which may be resistingly deformable (bent) in an axial direction to fix the effective axial length of the rotary valve to match the axial distance between the stationary end face 17 and the stationary valve face 81. In assembly, the rotary valve 28 may be axially compressed until the rotary valve face 82 is flush with the end wall face of the housing and then, when the stationary valve member 29 is bolted to the end wall face of the housing, there is provided the right amount of axial fluid sealing clearance between the rotary valve face 82 and the stationary valve face 81. As the disk 48 is axially deformed in the compression operation, the rotary valve face 82 is maintained parallel to the stationary valve face 81 since the common intermediate annular body portion 44 is free to bend where it is connected to the disk 48. The axially deformable connection disk 48 constitutes a built-in axial fixation means by which the effective length of the rotary valve may be fixed by a compression operation.

In this application, the term "stator" and "rotor" are not used in a limited sense. The term "stator" is applied to the element which has a fixed axis and the term "rotor" is applied to the element which has a movable axis characterized in that said rotor is disposed for rotational movement about its own movable axis and for orbital movement about said fixed axis of the stator. Thus, in this application, the outer surrounding element, usually referred to as the stator, may be either the stator or the rotor, depending upon whether it has a fixed axis or a movable axis and the inner element, usually referred to as the rotor, may be either the rotor or the stator depending upon whether it has a movable axis or a fixed axis.

In the description, my device will be described as a fluid motor, but it is understood that it may be utilized for any other related purpose, particularly a pump.

As illustrated in FIG. 2, the stator element 32 has seven internal teeth which defines the outer wall of a fluid compartment. The rotor element 33 has six external teeth, one less than that of the stator element. The stator element may be described as having ($n$) number of internal teeth and the rotor element may be described as having ($n-1$) number of external teeth. The stator element has a center 69, usually referred to as the fixed or stationary axis since the stator element is stationarily mounted and does not rotate, in this application and claims, the expression "fixed stator axis" or simply "fixed axis," includes not only the fixed axis of the rotor, but also any axis which coincides, or is in alignment therewith.

The rotor 33 has a movable axis, identified by the reference character 70, and is radially spaced from and moves in an orbital path about the fixed axis 69 of the stator. The orbital path of the movable axis 70 is a true circle with its center coinciding with the fixed axis of the stator. The diameter of the true circle, orbital path, is equal to the difference in the radial dimension between the crest contour and the root contour of a stator tooth. Upon relative movement between the rotor and the stator, the movable axis 70 of the rotor orbits in a true circle about the fixed axis of the stator. As the rotor moves within the stator, the intermeshing teeth of the rotor and stator divide the fluid compartment confined therebetween into high- and low-pressure chambers along a revolving divisional line passing substantially diametrically through the fixed axis of the stator. For the position in FIG. 2, the divisional line is substantially diametrically vertical. For the position shown in FIG. 2, the divisional line may be more properly described as a divisional tapering band rather than a line and comprises substantially a slender triangle having an apex at the point where the top rotor tooth in FIG. 2 touches or contacts the arcuate surface of the stator contour and having a base defined by the distance between the sealing contact engagement on opposite sides of the bottom rotor tooth when fitting full-depth into the bottom stator tooth. To rotate the rotor 33 in a clockwise direction, the chambers on the left-hand side of the revolving divisional line or tapering band become high-pressure chambers and the chambers on the right-hand side become low-pressure chambers. The high- and low-pressure chambers, which may be referred to as operating chambers, alternately expand and contract as the rotor and stator move relative to each other. The divisional line or tapering band continually revolves in a counterclockwise direction as the rotor rotates in a clockwise direction within the stator.

As shown in FIG. 1, the actuating shaft 39 has a right-hand end portion provided with male spline teeth 71 which fit within female spline teeth 72 in the rotor, being referred to herein as first connection means. Thus, the right-hand end portion of the actuating shaft 39 is disposed for rotational movement about its own movable axis and for orbital movement about the fixed axis of the stator. The connection means between the left-hand end portion of the actuating shaft 39 and the main shaft 25, herein referred to as second connection means, also comprises male spline teeth 73 on the actuating shaft 39 which fit within female spline teeth 74 in the central core of the main shaft 25. The left-hand end portion of the actuating shaft, that is the second connection means, is disposed for rotational movement substantially free from orbital movement about the fixed axis of the stator. A third connection means comprises drive means indicated by the dotted line 40 which interconnects the intermediate shaft portion 38 with the boss 26 for rotating the rotary valve 28 one rotation for each rotation of the actuating shaft.

In operation there is a disposition for the rotary valve to have a circumferential rotational phasing with respect to the rotation of the actuating shaft 39. During certain portions of the orbit movement of the actuating shaft, the rotational phasing has the effect of subtracting from the rotation of the actuating shaft, with the result that the speed of rotation of the rotary valve is reduced. During other portions of the orbit movement, the rotational phasing has the effect of adding to the rotation of the actuating shaft, with the result that the speed of rotation of the rotary valve is increased. The rotational phasing makes a fresh start at the beginning of each orbit and terminates at the end of each orbit. The amount of the circumferential displacement resulting from the rotational phasing is a function of the radius of the orbital movement at the intermediate portion 38 of the actuating shaft. The rotational phasing has the effect of varying the timing of the rotary valve with respect to the movements of the rotor within the stator and produces a new valving action.

The valve system means in the present application, comprising the rotary valve member 28 and the stationary valve member 29 operates substantially the same as that shown and described in my above mentioned application. To this end, the external flange rim 45 has a first series of six commutating fluid connection means 83 extending therethrough and connects the external (first) annular fluid chamber means, outside of the rotary valve, in constant fluid communication with the stationary valve face 81. The internal flange rim 46 has a second series of six commutating fluid connection means 84 extending therethrough and connects the internal (second) annular fluid chamber means, inside the rotary valve, in constant fluid communication with the stationary valve face 81. The annular surface area band 43 is disposed between and sealingly separates the first and second series of commutating fluid connection means 83 and 84. It will also be seen that the common intermediate annular body portion 44 separates the first and second series of commutating fluid connection means 83 and 84. The first and second series of commutating connection means are alternately disposed with respect to each other and are circumferentially disposed relative to the fixed axis and spaced at annular intervals thereabout at substantially 30° from each other. The stationary valve member 29 has seven fluid openings 80 communicating respectively with the operating fluid chambers in the stator-rotor mechanism. The seven fluid openings 80 in the stationary valve member 29 terminate respectively in the stationary valve face 81, with the fluid opening being circumferentially disposed about the fixed axis and spaced at annular intervals thereabout at 51 3/7° from each other.

In operation as a fluid motor, high-pressure fluid from the high-pressure port 23 commutatively flows through the first series of commutating fluid connection means 83 of the rotary valve into the fluid openings 80 of the stationary valve member 29 and thence into the expanding pressure fluid chambers in the stator-rotor mechanism and drives the rotor 33 in a clockwise rotational direction within the stator 32. As the rotor is driven, the exhaust fluid in the low-pressure contracting chambers commutatively flows through the fluid openings 80 of the stationary valve 29 into the second series of fluid commutating connection means 84 of the rotary valve and thence to the low-pressure port 24. As the rotor is driven by the high-pressure fluid, it operates the main shaft 25 through the actuating shaft 39.

The registration of the fluid connection means provided by the rotating valve face 82 in sealing engagement with the stationary valve face 81 is such that there is a first series of commutating fluid connections between the high-pressure port 23 and the expanding fluid chambers in the stator-rotor mechanism and a second series of commutating fluid connections between the contracting fluid chambers and the low-pressure port 24. In FIG. 4, the place where the annular surface area band 43 rotates against the stationary valve face 81, is illustrated by the concentric dash-dot lines being the same as the dash-dot lines in FIG. 5. Thus, the terminal openings 80 have an outer portion 90 and an inner portion 91 respectively residing outside and inside the place where the annular surface area band 43 rotates against the stationary valve face 81. As will be seen, the outer portion 90 and the external (first) annular fluid chamber, outside of the rotary valve, are commutatively connected together, and the inner portion 91 and the internal (second) annular fluid chamber, inside of the rotary valve, are commutatively connected together. In this construction, the terminal openings 80 have an elongated dimension in a radial direction extending across the annular band 43, whereby fluid may commutatively flow through both the first and second series of fluid connection means 83 and 84. The elongated dimension of the terminal openings 80 is such that they radially overlap the first and second series of fluid connection means 83 and 84 during commutation movement.

The rotating valve 28 is independent of any radial thrust or of any end thrust to which the main shaft 25 may be subjected. Also the rotating valve 28 is substantially free from any radial thrust or any end thrust due to fluid pressure acting thereupon. In summary, the valve system means, including the rotary valve 28 and the stationary valve member 29, controls the entrance of fluid to and the exit of fluid from the operating chambers of the stator-rotor mechanism.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Valving means for fluid pressure device having first and second fluid port means and fluid pressure operating means, first and second fluid connection means for respectively connecting said first and second fluid port means commutatively with said fluid pressure operating means, said first and second fluid connection means including stationary valve means and rotary valve means having first and second end portions, said stationary valve means having a stationary valve face and a plurality of circumferentially disposed fluid openings extending from said stationary valve face and communicating with said fluid pressure operating means, wall body means including face wall means disposed substantially parallel to and spaced axially from said stationary valve face, said first end portion of said rotary valve means having a rotary valve face sealingly engaging said stationary valve face, said second end portion of said rotary valve means having a rotary end face sealingly engaging said face wall means, said first and second fluid connection means extending through said stationary and rotary valve faces, said first fluid connection means including first fluid chamber means in constant fluid communication with said first fluid port means, said rotary valve means having first surface wall means extending externally therearound and axially disposed between said first and second end portions, said first fluid chamber means having first chamber wall means including said first surface wall means, said first and second end portions of said rotary valve means respectively having first and second body portion means extending outwardly from said first surface wall means, said first fluid connection means extending through said first body portion means, said first body portion means, having first and second opposed walls, said rotary valve face including said first opposed wall, said second body portion means having third and fourth opposed walls, said rotary end face including said third opposed wall, said first chamber wall means also including said second opposed wall of said first body portion means and said fourth opposed wall of said second body portion means, said first surface wall means extending between said second opposed wall of said first body portion means and said fourth opposed wall of said second body portion means and defining with said second and fourth opposed walls an external annular fluid channel extending around said rotary valve means.

2. The structure of claim 1, wherein said first fluid connection means includes a first series of circumferentially disposed commutating fluid conduction means extending through said first body portion means and commutating with said plurality of fluid openings.

3. The structure of claim 1, wherein wherein said first series of commutating fluid conduction means comprises one less in number than said plurality of fluid openings.

4. The struction of claim 1, wherein said rotary valve means has second surface wall means extending internally therearound, said first and second end portions of said rotary valve means respectively having third and fourth body portion means extending inwardly from said second surface wall means, said third and fourth body portion means having facing walls, said second surface wall means extending between and defining with said facing walls of said third and fourth body portion means an internal annular fluid channel within said rotary valve means, said second fluid connection means including second fluid chamber means in constant fluid communication with said second fluid port means, said second fluid chamber means having second chamber wall means including said second surface wall means and said facing walls of said third and fourth body portion means.

5. The structure of claim 4, wherein said second fluid connection means has a second series of circumferentially disposed commutating fluid conduction means extending through said third body portion means and commutating with said plurality of fluid openings.

6. The structure of claim 5, wherein said second series of commutating fluid conduction means comprises one less in number than said plurality of openings.

7. The structure of claim 6, wherein said rotary valve face has substantially a circular fluid sealing band having outer and inner circumferential dimensions disposed between said first and second series of commutating fluid conduction means, said plurality of fluid openings respectively having an outer dimension and an inner dimension defining substantially the length thereof in generally a radial direction, said outer circumferential dimension of said band being less than the outer dimension of said plurality of fluid openings and said inner circumferential dimension of said band being greater than the inner dimension of said plurality of fluid openings.

8. The structure of claim 1, including housing means having internal circumferential wall means, rotatable means for rotatively supporting said rotary valve means within said circumferential wall means, said first body portion means respectively having peripheral wall means spaced from said circumferential wall means whereby said rotary valve means is free from contact with said circumferential wall means and is totally supported for rotation within said circumferential wall means by said rotatable means.

9. The structure of claim 8, wherein said rotatable means includes bearing means.

10. Valving means for fluid pressure device having first and second fluid port means and fluid pressure operating means, first and second fluid connection means for respectively connecting said first and second fluid port means commutatively with said fluid pressure operating means, said first and second fluid connection means including stationary valve means and rotary valve means having first and second end portions, said stationary valve means having a stationary valve face and a plurality of circumferentially disposed fluid openings extending from said stationary valve face and communicating with said fluid pressure operating means, wall body means including face wall means disposed substantially parallel to and spaced axially from said stationary valve face, said first end portion of said rotary valve means having a rotary valve face sealingly engaging said stationary valve face, said second end portion of said rotary valve means having a rotary end face sealingly engaging said face wall means, said first and second fluid connection means extending through said stationary and rotary valve faces, said first fluid connection means including first fluid chamber means in constant fluid communication with said first fluid port means, said rotary valve means having first surface wall means extending externally therearound, said first fluid chamber means having first chamber wall means including said first surface wall means, said first end portion of said rotary valve means having first body portion means extending outwardly from said first surface wall means, said first fluid connection means extending through said first body portion means, said first body portion means having first and second opposed walls, said rotary valve face including said first opposed wall, said first chamber wall means also including said second opposed wall of said first body portion means, housing means having internal circumferential wall means, rotatable means for rotatably supporting said rotary valve means within said circumferential wall means, said first body portion means having peripheral wall means spaced from said circumferential wall means whereby said rotary valve means is free from contact with said circumferential wall means and is totally supported for rotation within said circumferential wall means by said rotatable means.

11. The structure of claim 10, wherein said rotatable means includes bearing means.

12. Valving means for fluid pressure device having fluid pressure operating means, said valving means comprising stationary valve means and rotary valve means for controlling the flow of fluid to and from said fluid pressure operating means, said stationary valve means having a stationary valve face, said rotary valve means having a rotary valve face sealingly engaging said stationary valve face, said rotary valve means, having an external annular surface defining an external fluid chamber extending therearound and having an internal annular surface defining an internal fluid chamber, said external surface and said internal surface defining common wall means between said external and internal fluid chambers, axial force means for transmitting an axial force through said common wall means and constraining said rotary valve face against said stationary valve face, and reaction wall means for said force means.

13. The structure of claim 12, wherein said force means includes resilient wall means.

14. The structure of claim 13, wherein said resilient wall means is exposed to fluid pressure.

15. In a fluid pressure device having first and second substantially concentric structure surfaces extending longitudinally thereof, hollow housing structure means having first and second open end portions, load shaft structure means, antifriction bearing means mounted in said hollow housing structure means for radially and axially supporting said load shaft structure means against radial and axial thrust, said load shaft structure means being mountable in said hollow housing structure means through said first open end portion, closure means removably connected to said first end portion of said hollow housing structure means, said load shaft structure means having an extension portion extending through said closure means and adapted for external connection to a load, fluid pressure operating means connected in face relation to said second open end portion of said hollow housing structure means, said fluid pressure operating means including rotor means adapted for rotational and orbital movements, said structure means defining said first and second substantially concentric structure surfaces, one of said first and second substantially concentric structure surfaces constituting a structure bearing support surface and the other constituting a structure reference surface, rotary valve means rotatively mounted between said first and second substantially concentric structure surfaces independently of said load shaft structure means, whereby said rotary valve means is independently free from radial and axial thrust to which said load shaft structure means may be subjected, said rotary valve means controlling the flow of fluid to and from said pressure operating means and having first and second substantially concentric rotary surfaces extending longitudinally thereof, one of said substantially concentric rotary surfaces being rotatably supported on said structure bearing surface and the other being radially spaced from said structure reference surface and free from contact therewith, and drive means connected to said rotor means for driving said load shaft structure means and said rotary valve means.

16. The structure of claim 15, wherein said closure means constitutes reaction wall means for opposing axial thrust of said load shaft structure means.

17. The structure of claim 15, wherein said antifriction bearing means includes a plurality of rollers mounted in a cup fitting within said hollow housing structure.

18. The structure of claim 15, wherein said rotary valve means comprises a hollow annular body.